| (12) | United States Patent | (10) Patent No.: | US 8,360,521 B2 |
|---|---|---|---|
| | Macliver | (45) Date of Patent: | Jan. 29, 2013 |

(54) HARNESSES FOR USE WITH CHILD SAFETY SEATS

(76) Inventor: Kevin Scott Macliver, Birmingham (GB)

( * ) Notice: Subject to any disclaimer, the term of this patent is extended or adjusted under 35 U.S.C. 154(b) by 325 days.

(21) Appl. No.: 11/916,380

(22) PCT Filed: Jun. 5, 2006

(86) PCT No.: PCT/GB2006/002033
§ 371 (c)(1),
(2), (4) Date: Dec. 20, 2007

(87) PCT Pub. No.: WO2006/129112
PCT Pub. Date: Dec. 7, 2006

(65) Prior Publication Data
US 2008/0211278 A1    Sep. 4, 2008

(30) Foreign Application Priority Data
Jun. 3, 2005    (GB) .................................. 0511317.0

(51) Int. Cl.
*B60N 2/28*    (2006.01)
(52) U.S. Cl. ...................... 297/250.1; 297/483; 297/484
(58) Field of Classification Search ............... 297/250.1, 297/483, 484; 280/801.1, 808
See application file for complete search history.

(56) References Cited

U.S. PATENT DOCUMENTS

| 2,833,343 | A | * | 5/1958 | Benson ........................... 297/473 |
|---|---|---|---|---|
| 4,040,664 | A | * | 8/1977 | Tanaka et al. .................. 297/467 |
| 4,973,083 | A | * | 11/1990 | Richards et al. ............ 280/801.1 |
| 5,997,098 | A | * | 12/1999 | Coffeen .......................... 297/483 |
| 6,155,638 | A | * | 12/2000 | Bapst .......................... 297/250.1 |
| 6,189,970 | B1 | * | 2/2001 | Rosko ......................... 297/250.1 |
| 6,846,020 | B2 | * | 1/2005 | Xu .................................. 280/808 |
| 2002/0167213 | A1 | * | 11/2002 | Warner et al. ................. 297/483 |

FOREIGN PATENT DOCUMENTS

| EP | 0501623 A1 | 9/1992 |
|---|---|---|
| EP | 1338485 A2 | 8/2003 |
| JP | 55138145 | 10/1980 |
| JP | 59154325 | 4/1984 |
| JP | 1-178745 | 12/1989 |
| JP | 10-226309 | 8/1998 |
| JP | 2001-158265 | 6/2001 |
| WO | 9709194 A2 | 3/1997 |

* cited by examiner

*Primary Examiner* — Peter R. Brown
(74) *Attorney, Agent, or Firm* — Caesar, Rivise, Bernstein, Cohen & Pokotilow, Ltd.

(57) ABSTRACT

This invention relates to restraining means for seats which can be conveniently adjusted. Accordingly, the invention consists in one aspect of a seat assembly comprising a seat having one or more straps, the straps having a primary bracing point located on the assembly, one or more apertures, and at least one bracing member, wherein the bracing member is co-operable with at least one of the straps and at least one of the apertures to form a secondary bracing point for the strap. In a second aspect, the invention consists of a five-point harness for a child's safety seat, comprising at least one strap and at least one bracing member, the bracing member having a bracing surface for engagement with at least one strap, the bracing member being moveable along said strap to be co-operable with apertures in a seat to be secured releasably to said seat.

2 Claims, 2 Drawing Sheets

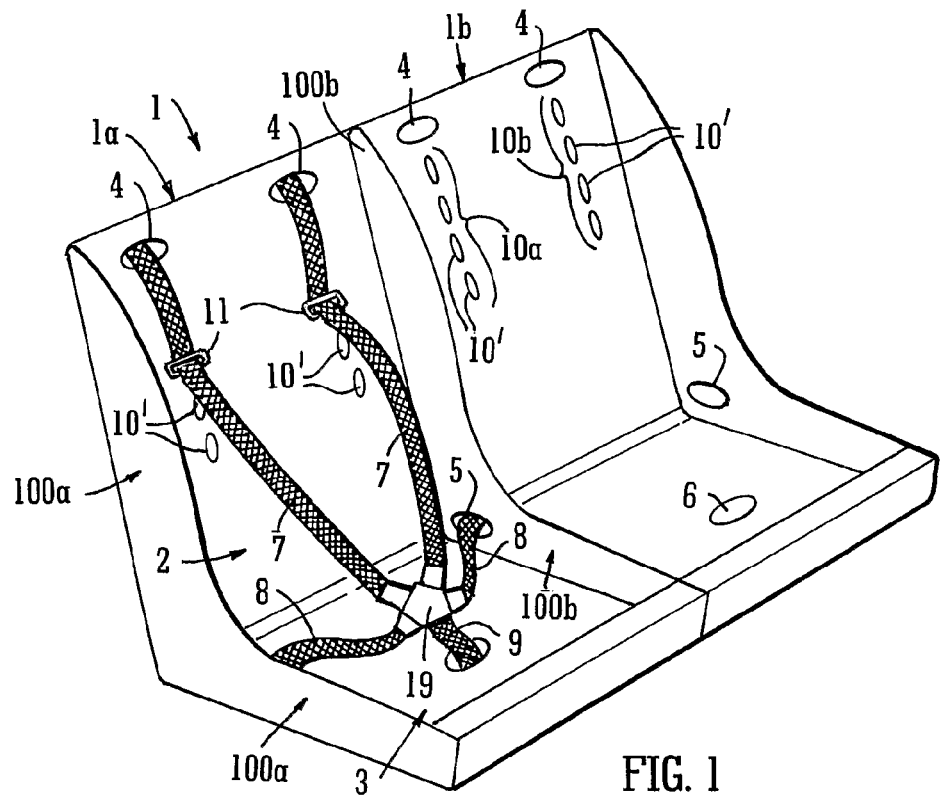
FIG. 1
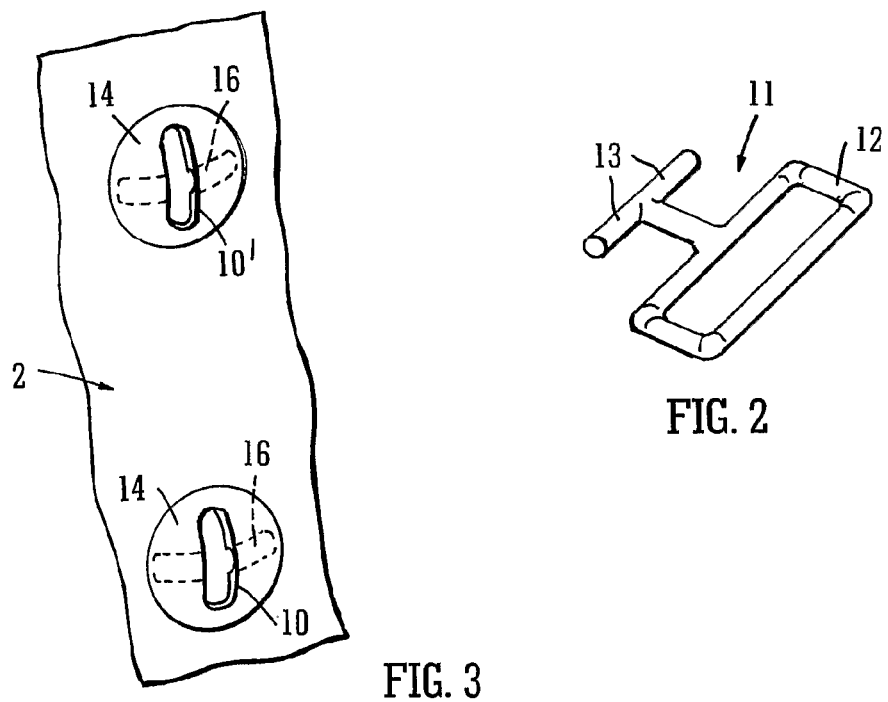
FIG. 2
FIG. 3

HARNESSES FOR USE WITH CHILD SAFETY SEATS

BACKGROUND

This invention relates to restraining, and more specifically, but not exclusively, to restraining means for seats. The invention is particularly concerned with providing restraining means which can be conveniently adjusted.

There are several uses for seats with restraining means such as amusement park rides, motor vehicle seats, child high chairs or child safety seats which can be releasably secured to existing seats within a motor vehicle. All of these applications require restraining arrangements which can accommodate individuals of different sizes. Restraining arrangements can consist of rigid assemblies, as is often the case for amusement park rides, but this invention is particularly concerned with strap type restraining harnesses.

The effectiveness of a strap type restraining harness is largely dependent on the number of straps, the strap length between anchorage points and the number and position of anchorage locations relative to the occupant. Harness designs for the aforementioned applications must take into account the comfort of the restrainee, which may be adversely affected when these factors are designed based on restraining effectiveness, as well as the type or nature of the restrainee, e.g. child, adult, disabled person, and so on.

Conventional harness straps generally brace against a fixed location relative to the seat, or on the seat itself, and means for adjusting the length of the straps is often provided. This arrangement is usually adequate when there is only one harness strap, as is can be the case with some rear seats of a motor vehicle. However, the front seats of a motor vehicle are generally fitted with one strap across the lap of the occupant and another that runs diagonally across the occupant's abdomen, often referred to as a shoulder strap. The shoulder strap extends diagonally from a fixing point on one side of the occupant's pelvis across his or her abdomen and over the shoulder on the opposite side to a bracing or fixing location remote from the seat. The effectiveness of the harness and comfort of the occupant are both dependent on the path of the strap relative to the occupant's body, which is defined by the fixing or bracing points at either end of the strap. It is therefore advantageous to provide adjustability in the fixing and/or bracing locations.

Harness strap arrangements with adjustable bracing points are known, particularly in the case of safety belts for motor vehicles. For example, a seat belt assembly for restraining a front seat passenger often comprises adjustment means for altering the height of the shoulder strap bracing location. The adjustment means is generally fixed to the frame of the vehicle, but separate from the seat. Consequently, the adjustability of the shoulder strap is limited by the size and shape of the seat to comfortably accommodate different size individuals.

It is therefore one object of this invention to provide a seat with simple means for easily adjusting the bracing point of harness straps that is not limited by the dimensions of the seat.

SUMMARY OF THE INVENTION

This invention may be of particular benefit to child seats fitted with restraining straps. Child seats, booster seats and booster cushions sold in the United Kingdom must conform to the United Nations Regulation R44.03 or the later R44.04 for child restraints which provides specific design guidelines. The most common restraint system for child safety seats today is what is known as a five point harness. Five straps are either fixed to or brace against the child seat in separate locations and extend across the child's body to a central fastener. The fixing or bracing locations are above each of the child's shoulders, on either side of the child's pelvis and between the child's legs and should be as close to the child's body as possible to maximise the restraining effectiveness.

It is therefore advantageous to provide a child's safety seat with means for adjusting the fixing or bracing locations of the harness straps. Such arrangements are known wherein the seat back includes a plurality of slots at different locations through which the straps are run. Each of the straps may be provided with rigid flanges at one end which cooperate with the rear side of the seat to secure it, or alternatively, each of the straps may extend to a central fastener on the rear side of the seat with a portion of the strap bracing against one edge of the aforementioned slots. Such an arrangement is described in EP 0501623, where the bracing point of the shoulder strap is adjustable through being co-operable with a plurality of apertures along the back of the seat. A similar arrangement is disclosed in EP 1338485.

While this solution is adequate for occasional adjustment, it is inconvenient if frequent adjustment is required, since access to the rear of the safety seat is required in order to make the adjustment. Furthermore, this arrangement is particularly inconvenient in the case of a child seat as described in PCT application WO 97/09194 (the entire disclosure of which is incorporated herein) which discloses a seat that is sub-divided to provide a plurality of individual child safety seats.

It is therefore a further object of this invention to provide a seat with means for easily adjusting the bracing point of harness straps from the occupant facing side.

According to a first aspect of the present invention, there is provided a seat assembly comprising:
 a) a seat having a base portion, a back portion and one or more straps, said straps having a primary bracing point located on the assembly;
 b) one or more apertures located between the base portion and the primary bracing point
 c) at least one bracing member;
wherein said bracing member is co-operable with at least one of said straps and at least one of said apertures to form a secondary bracing point for said strap.

Preferably said bracing member is securable to said seat from the occupant facing side.

Preferably the bracing member comprises an auxiliary strap.

Preferably the bracing member further comprises:
 i) a first portion adapted to engage releasably with at least one of said strap(s);
 ii) a second portion adapted to engage releasably with at least one of said aperture(s).

Preferably the auxiliary strap is attached to said first portion.

Preferably the auxiliary strap is releasably attached to said first portion.

Preferably the first portion comprises an aperture through which the at least one strap passes.

Preferably the first portion further comprises a flat bracing surface.

Preferably the second portion comprises one or more integral flanges shaped and sized to be passable through the one or more apertures in a first orientation and are not passable through said apertures in a second orientation.

Preferably the one or more apertures are shaped and sized such that the second portion of the bracing member may pass through in a first orientation before being rotated into a second orientation and moved into a position in which passage through the aperture and further rotation of the bracing member are not possible.

Preferably the assembly further comprises a padded sleeve wrapped around said at least one strap.

Preferably the secondary bracing point is located below the primary bracing point.

Preferably the secondary bracing point is located in substantially the same vertical plane as the primary bracing point.

Preferably the seat assembly is a child's safety seat to be attached securely and releasably to an existing seat in a vehicle.

Preferably the seat is sub-divided to provide a plurality of individual seats.

In accordance with a further aspect of the invention, there is provided a five-point harness for a child's safety seat, said harness comprising at least one strap and at least one bracing member, said bracing member having a bracing surface for engagement with said at least one strap, said bracing member being moveable along said strap to be co-operable with apertures in a seat to be secured releasably to said seat.

Preferably the bracing member comprises:
  i) a first portion adapted to engage releasably with at least one of said strap(s);
  ii) a second portion adapted to engage releasably with at least one of said aperture(s).

Preferably the bracing member further comprises:
  iii) an auxiliary strap attached to said first portion.

Preferably the auxiliary strap is releasably attached to said first portion.

Preferably the first portion comprises an aperture through which the at least one strap passes.

Preferably the first portion further comprises a flat bracing surface.

Preferably the second portion comprises one or more integral flanges shaped and sized to be passable through the one or more apertures in a first orientation and are not passable through said apertures in a second orientation.

Preferably the one or more apertures in a seat are shaped and sized such that the second portion of the bracing member may pass through in a first orientation before being rotated into a second orientation and moved into a position in which passage through the aperture and further rotation of the bracing member are not possible.

Preferably the harness further comprises a padded sleeve wrapped around said straps.

BRIEF DESCRIPTION OF THE DRAWINGS

Embodiments of the invention will now be described by way of example only with reference to the accompanying drawings in which:

FIG. 1 is a perspective view of a child safety seat comprising this invention

FIG. 2 is a perspective view of the bracing member

FIG. 3 shows a more detailed perspective view of the securing slots in the back portion of the seat

DETAILED DESCRIPTION OF PREFERRED EMBODIMENTS

Figure 4:
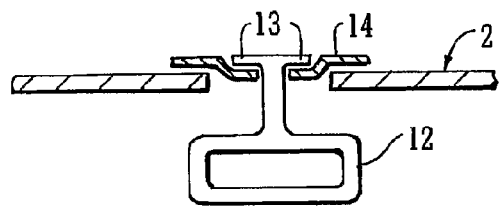
FIG. 4 is a cross sectional view of the reinforcement member in FIG. 3 with the bracing member in place

Referring to FIG. 1, a child's safety seat 1 is shown which is divided into a plurality of child-seating portions 1a, 1b . . . by dividers 100a, 100b . . . . Each seating portion 1a, 1b . . . has a back portion 2 and base portion 3 and is provided with slots 4 in the back 2 and slots 5 and 6 in the base 3. Two columns 10a and 10b of matched securing slots 10', 10" . . . are provided in the back 2, each column 10a and 10b extending from the slots 4 toward the base 3 and each successive securing slot being spaced vertically apart from the next by a predetermined distance. The distance between the columns 10a and 10b and the distance between successive securing slots in each column 10a and 10b are configured to provide a pair of securing slots corresponding to the shoulders of occupants of different sizes, as will be described below.

As shown in FIG. 1, the first seat portion 1a is provided with a conventional five point safety harness comprising straps 7, 8 and 9 which are respectively received in slots 4, 5 and 6. The end of the straps 7, 8 and 9 are retained by a fastener 19. FIG. 2 shows a bracing member 11 which comprises a rectangular section 12 to which is joined a T-shaped member comprising oppositely extending flanges 13. The bracing member 11 is made of forged steel and is capable of withstanding considerable forces.

Returning again to FIG. 1, two bracing members 11 are shown fitted into a pair of securing slots.

The securing slots are shown in FIG. 3 comprising reinforcement members 14 secured to the seat back 2 and exposed through holes 15 formed in the seat back 2. Reinforcement members 14 may comprise individual plates, or may be integrated in groups formed from a common backing plate, made of high strength material, for example stainless steel.

As shown in FIGS. 3 and 4, each reinforcement member 14 is formed with a vertical securing slot 10', 10" and a horizontal recess 16. Securing slots 10', 10" are dimensioned such that flanges 13 can pass through when the flanges 13 are vertically aligned with securing slot 10', 10". The size and shape of recesses 16 corresponds to flanges 13 to locate and secure bracing member 11 when a bracing load is applied.

Harness straps 7 extend from slots 4 through bracing member 11.

Figure 5:
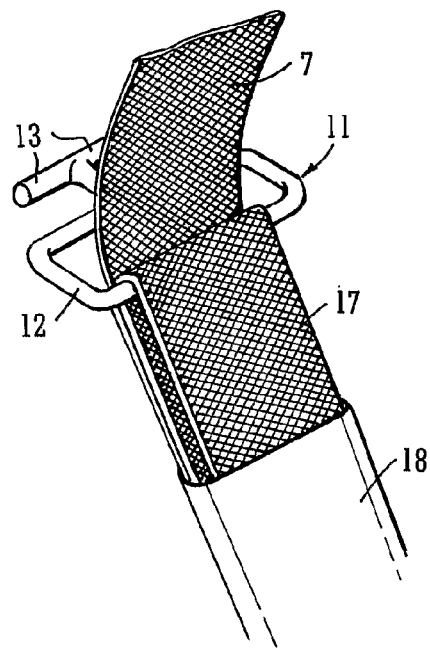
FIG. 5 shows the bracing member fitted with an auxiliary strap and a chest pad

FIG. 5 shows a preferred embodiment wherein an auxiliary strap 17 is provided, preferably with a chest pad 18. The weight of auxiliary strap 17 and chest pad 18 preloads bracing member flanges 13 against recess 16 to prevent relative movement therebetween when seat 1 is unoccupied.

Auxiliary strap 17 may be permanently or releasably secured to the rectangular section 12 of bracing member 11. The chest pad 18 preferably consists of a padded material wrapped around the auxiliary strap 17 and is sufficiently slack to allow harness strap 7 to be passed through it such that the harness strap 7 and the auxiliary strap 17 are contiguous to one another. This arrangement also provides a means for ensuring that the orientation of the bracing member 11 coincides with that of the harness strap 7.

Figure 6:
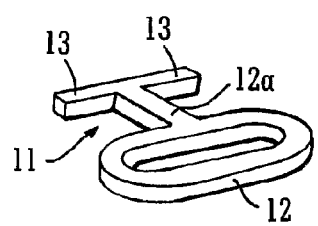
FIG. 6 is a perspective view of a preferred further embodiment of the bracing member

FIG. 6 shows a preferred embodiment of the bracing member 11 which comprises a rectangular section 12 to which is joined a T-shaped member comprising a shank 12a and oppositely extending flanges 13. The bracing member 11 is made of forged steel and is capable of withstanding considerable forces. The shank 12a is preferably 4 mm by 5 mm in width and height.

Figure 8:
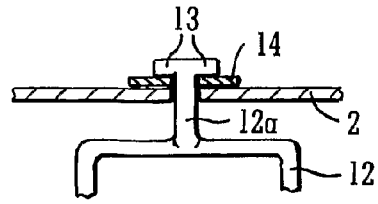
FIG. 8 is a cross sectional view of a preferred further embodiment of the reinforcement member of FIG. 7 with the bracing member in place.

A preferred embodiment of the securing slots is shown in FIG. 8 comprising reinforcement members 14 secured to the seat back 2 and exposed through holes formed in the seat back 2. Reinforcement members 14 may comprise individual plates, or may be integrated in groups formed from a common backing plate, made of high strength material, for example stainless steel.

Figure 7:
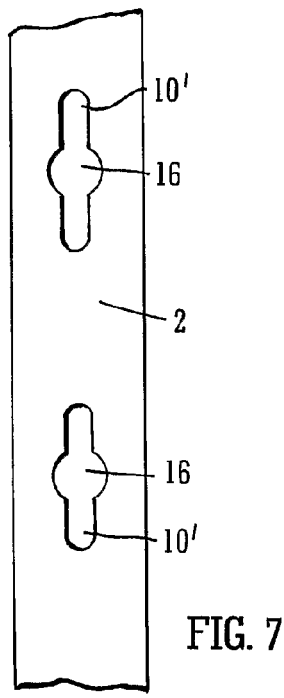
FIG. 7 shows a more detailed perspective view of a preferred further embodiment of the securing slots in the back portion of the seat

As shown in FIGS. 7 and 8, in a preferred embodiment each reinforcement member 14 is formed with a vertical securing slot 10', 10" of preferably 5.5 mm in width and a circular cut-out 16. Securing slots 10', 10" are dimensioned such that flanges 13 can pass through when the flanges 13 are vertically aligned with securing slot 10', 10". The size and shape of circular cut-out 16 is such that the bracing member 11 can be rotated and the flanges 13 thus horizontally aligned. Once released, the bracing member 11 will drop down to the lowest point of the slot 10' or 10". Since the diagonal cross section of the rectangular shank 12a is preferably around 6.4 mm, shank 12a cannot turn in the lowest point of the slot 10' or 10" and hence bracing member 11 can be secured to withstand a bracing load.

In use, the safety seat 1 is fastened to an existing seat in a motor vehicle. In the event of an impulse urging the occupant to be moved relative to the seat 1, straps 7, 8 and 9 are tensioned. The straps act against bracing points on the seat to restrain the child.

With the configuration shown in FIG. 1, the straps 7 brace against the bracing members 11 and restrain the child's chest, while straps 8 brace against slots 5 and restrain the child's pelvic area and the strap 9 prevents the child from sliding along the base 3 of the seat 1 (referred to as 'submarining').

Prior to placing a child in the seat 1, the straps 7, 8 and 9 are separated from the central fastener 19 and spread apart. A child is located in the seat 1. The harness is then fixed around the child and the bracing members 11 are placed into a pair of securing slots 10', 10" closest to the child's shoulders. The bracing member is located in the securing slots 10', 10" by ensuring that the bracing member 11 is in a vertical orientation, then passing bracing member flanges 13 through vertical securing slots 10', 10", and rotating the bracing member 11 to bring the flanges 13 into engagement with recesses 16. Alternatively, the bracing member 11 is rotated in the circular cut-out 16 to bring the flanges 13 into a horizontal alignment before releasing bracing member 11 to drop to the lowest point of the slot 10', 10".

To remove the child, the fastener 19 is released. Bracing members 11 are removed and re-positioned only when the height has to be adjusted to accommodate a different size occupant.

The provision of columns 10a and 10b of securing slots 10', 10" in association with the bracing member 11 enables children of different sizes to be able to use the same five point safety harness.

In accordance with R44.04, the harness must include a centralised tensioning device such as a tensioning strap, which passes through a self-locking adjuster positioned in the front of the seat between the child's legs. Once the bracing members have been set at the correct height with respect to the occupant, the separate elements of fastener 19 are clipped together and a tensioning strap is pulled such that the slack is taken out of all five elements of the harness.

The straps 7, 8 and 9 can be made of webbing. The seat back 2 may consist of aluminium or a high strength plastics material. The seat may be upholstered. The seat may comprise support legs to bear on a structural part of a car, when located therein.

Whilst the safety seat restraining system described above is a five point harness, any child seat with restraining straps, for example a three point harness, may benefit from the present invention. Furthermore, while this embodiment comprises a safety seat subdivided to form individual seats, it should be appreciated that this in no way limits the scope of this invention to such an arrangement. For example, child high chairs, booster seats, or any other restraining seats will benefit from the invention.

The invention claimed is:

1. A five-point harness for use in a child's safety seat, said harness comprising at least one strap extendable through a slot in a seat and at least one bracing member, said bracing member having a bracing surface for engagement with said at least one strap, said bracing member being moveable along said strap to be co-operable with apertures located in a back portion of the seat between a base portion of the seat and the slot, wherein the bracing member comprises:
   i) a first portion including the bracing surface and being adapted to engage releasably with at least one of said strap(s); and
   ii) a second portion adapted to engage releasably with at least one of said aperture(s),
wherein the second portion comprises one or more integral flanges shaped and sized to be passable through the one or more apertures in a first orientation and are not passable through said apertures in a second orientation.

2. A five-point harness for use in a child's safety seat, said harness comprising at least one strap extendable through a slot in a seat and at least one bracing member, said bracing member having a bracing surface for engagement with said at least one strap, said bracing member being moveable along said strap to be co-operable with apertures located in a back portion of the seat between a base portion of the seat and the slot, wherein the bracing member comprises:
   i) a first portion including the bracing surface and being adapted to engage releasably with at least one of said strap(s); and
   ii) a second portion adapted to engage releasably with at least one of said aperture(s),
wherein the one or more apertures in said seat are shaped and sized such that the second portion of the bracing member may pass through in a first orientation before being rotated into a second orientation and moved into a position in which passage through the aperture and further rotation of the bracing member are not possible.

\* \* \* \* \*